United States Patent [19]

Nakamura et al.

[11] Patent Number: 4,661,420
[45] Date of Patent: Apr. 28, 1987

[54] OPTICAL MAGNETIC RECORDING MEMBER

[75] Inventors: Kyuzo Nakamura; Yoshifumi Ota; Shin Asari; Tsutomu Asaka, all of Chiba, Japan

[73] Assignee: Nihon Shinku Gijutsu Kabushiki Kaisha, Kanagawa, Japan

[21] Appl. No.: 698,480

[22] Filed: Feb. 5, 1985

[30] Foreign Application Priority Data

Feb. 6, 1984 [JP] Japan .................................. 59-18253
Mar. 15, 1984 [JP] Japan .................................. 59-48205

[51] Int. Cl.$^4$ .............................................. G11B 7/24
[52] U.S. Cl. ................................. 428/692; 428/694; 428/900; 369/288
[58] Field of Search ............... 428/694, 132, 693, 692, 428/900; 365/122; 360/131, 135; 369/288

[56] References Cited

U.S. PATENT DOCUMENTS

| | | | |
|---|---|---|---|
| 3,472,575 | 10/1969 | Hunt | 350/151 |
| 3,965,463 | 6/1976 | Chaudhari et al. | 340/174 |
| 4,042,341 | 8/1977 | Smeggil | 428/693 |
| 4,390,600 | 6/1983 | Ohta et al. | 428/900 |
| 4,554,217 | 10/1985 | Grimm et al. | 428/694 |

FOREIGN PATENT DOCUMENTS 111988  3/1983  European Pat. Off. .

OTHER PUBLICATIONS

IBM Technical Disclosure Bulletin Antireflection Coating . . . Alloys Cuomo et al, vol. 16 #5, 10-73.

Primary Examiner—Edith Buffalow
Attorney, Agent, or Firm—Armstrong, Nikaido, Marmelstein & Kubovcik

[57] ABSTRACT

An enhancement of the Kerr rotation angle is obtained in a magnetic recording member by providing an amorphous layer of Si, Ge, or alloy thereof. Such layer may further contain any of the following additional elements: H, C, F, N and O.

3 Claims, 7 Drawing Figures

OPTICAL MAGNETIC RECORDING MEMBER

BACKGROUND OF THE INVENTION

This invention relates to an optical magnetic recording member which is characterized by an enhanced Kerr effect.

Recently, attention has focused on an optical magnetic recording medium which is capable of high density recording, for use in a system wherein recording and reproducing are carried out by a laser ray. In the reproducing process, when a polarized laser ray is either reflected at, or transmitted through, the surface of a magnetic recording medium, the polarization plane of the laser ray is rotated accordingly. It is desirable that this rotation angle (Kerr rotation angle) be as large as possible.

Certain materials have been used for the purpose of enhancing the Kerr rotation angle. The widely accepted view hitherto is that, in order for a material to have an enhancing effect on the Kerr rotation angle, it must be optically transparent. Thus, transparent dielectric materials such as SiO, $SiO_2$, ZnS, $Si_3N_4$, AlN, $TiO_2$, $Al_2O_3$, $Ta_2O_3$ or the like, have been provided on a surface of a magnetic layer, that is, a magnetic recording medium. It has been also known that, among materials used for increasing the Kerr rotation angle, those with a relatively large index of refraction have a relatively larger enhancing effect on the Kerr rotation angle. Especially in the case where reproducing on a magnetic recording member is carried out by irradiating a laser ray from the side of the transparent substrate of said magnetic recording member, it is desirable that the material used for enhancing the Kerr rotation angle have a higher index of refraction than in the case where reproducing is carried out by irradiating the substrate from the side adjacent to air, because the refractive index of glass or PMMA used for the substrate is about 1.5.

The wavelength of the laser used in the reproducing process with an optical magnetic recording member is about 800 nm, so that it is sufficient that the material used for increasing the Kerr rotation angle be transparent to the laser wavelength of about 800 nm. It is not always necessary that such material be transparent over the whole range of visible radiations, as are the conventional transparent dielectric materials mentioned above. From this perspective, the inventors have examined various materials, and as a result, have found that a very large enhancing effect on the Kerr rotation angle can be obtained by using, instead of the conventional dielectric layer, a material which has an index of refraction as high as 3.0–3.8, and also has a small absorption coefficient for a wavelength of 800 nm, and, in addition, has an index of refraction so much higher than that of glass or PMMA as to be suitable also for use in the case where reproducing on a magnetic recording member is effected by irradiating a laser ray from the side of the magnetic layer that is adjacent to the transparent substrate.

SUMMARY OF THE INVENTION

An object of this invention is to provide an optical magnetic recording member with a larger enhancing effect on the Kerr rotation angle than conventional optical magnetic recording members. According to this invention, in an optical magnetic recording member of the type wherein a substrate is provided with a magnetic layer, said magnetic layer is provided, at least on one surface thereof, with a layer of amorphous material consisting essentially of at least one member selected from the group consisting of Si and Ge.

Amorphous Si has a very high index of refraction (3.0–3.8). The index of refraction of amorphous Ge has not yet been fully investigated, but it can be presumed to be larger than that of amorphous Si, from the fact that the index of refraction of crystalline Ge (4.0) is larger than the index of refraction of crystalline Si (3.5).

The edge of the optical absorption band of amorphous Si is near 1000 nm, so that a laser ray is more or less absorbed if its wavelength is 800 nm. As for amorphous Ge, the energy transition associated with absorption at 800 nm is smaller than for amorphous Si. Therefore, the absorption coefficient of amorphous Ge around 800 nm is likely to be smaller than that of amorphous Si.

If the energy transition within the material is increased and the optical absorption band therefore moves towards a shorter wavelength, then the optical transmission near 800 nm decrease, and the Kerr rotation angle increases greatly. The inventors have investigated this prospect and, as a result, have found a means for increasing the energy transition in amorphous Si or amorphous Co, resulting in greater enhancement of the Kerr rotation angle.

Another object of this invention is to provide such an optical magnetic recording member as mentioned above, wherein the Kerr rotation angle is greatly increased, and characterized in that the layer of amorphous material contains at least one additional element selected from H, C, F, N and O, in an amount of about 50 at.% or less. It is preferable that the amount of the additional element be 30 at.% or less.

DESCRIPTION OF PREFERRED EMBODIMENTS

The invention will be further explained by the following description of embodying examples.

An amorphous Si layer is formed on an upper surface of a transparent substrate of glass, PMMA or the like, by a known process such as a sputtering process, a RF sputtering process, a plasma CVD process, a vapor deposition process, an ion plating process, an optical CVD process or the like.

If it is intended that amorphous Si (hereinafter denoted as $Si^{(am)}$) be mixed with at least one element selected from H, F, C, N and O to form a layer of $Si^{(am)}$:H, $Si^{(am)}$:F, $Si^{(am)}$C:H, $Si^{(am)}$N-H, $Si^{(am)}$O:H or the like, then a RF sputtering process or a plasma CVD process is used in which a single gas such as $H_2$, $N_2$, $SiH_4$, $SiF_4$, or a mixture of gases, is introduced into a treatment container. In order to mix C therein, a large number of graphite pellets is placed on a Si target. Thereafter, the layers thus prepared of amorphous Si, or amorphous Si containing additional elements, are provided on at least one of their surfaces with a magnetic recording film of 25 mole % Tb-Fe and a thickness of 1000 Å. These layers are further provided with a protective film of $SiO_2$ of a thickness of 1000 Å.

In order to examine the relationship between the film thickness and the Kerr rotation angle, various samples of the foregoing magnetic recording members were prepared with different film thicknesses. For measuring the Kerr rotation angle, a semiconductor laser of 830 nm is used. In addition, samples were prepared which have neither the Tb-Fe film nor the $SiO_2$ film formed on the amorphous Si layer. The optical absorption coefficient and the refractive index of each sample were measured.

Figure 1:
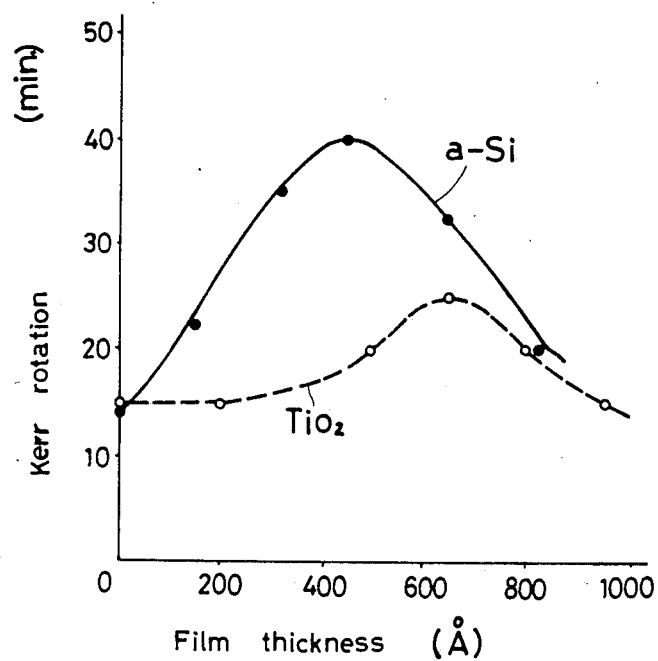
FIG. 1 shows the relationship between the layer thickness and the Kerr rotation angle, in one embodying example of an optical magnetic recording member of this invention, and in a conventional optical magnetic recording member.

FIG. 1 shows the relationship between the thickness of the amorphous Si layer and the Kerr rotation angle. For comparison, results are shown for a conventional magnetic recording member provided with a $TiO_2$ layer (which is a conventional dielectric) formed on the substrate.

As shown in FIG. 1, the Kerr rotation angle is about 15 minutes when the sample has only the Tb-Fe film and is not provided with an enhancing layer, but the Kerr rotation angle is increased to a maximum of 40 minutes with samples provided with the amorphous Si layer. FIG. 1 also shows that the Kerr rotation angle has a maximum of only 25 minutes with the sample provided with the conventional $TiO_2$ dielectric. Samples provided with the amorphous Si layer show an excellent enhancing effect on the rotation angle over the whole range of layer thickness, as compared with conventional dielectrics.

The layer thickness showing the maximum rotation angle is 650 Å in the case of the $TiO_2$, 450 Å in the case of the amorphous Si layer. This is because the index of refraction of $TiO_2$ is 2.3, while that of amorphous Si is 3.7.

The optical absorption coefficient of a layer containing only amorphous Si and having a thickness of 450 Å (corresponding to the maximum rotation angle), was 10%, as measured with a laser ray of 830 nm.

It has been confirmed that, in order to lower the optical absorption coefficient, it is effective to add to the amorphous Si layer at least one element such as H, C, O, and N. The relationship between the added amount of the element and the Kerr rotation angle was examined. The results are shown in FIG. 2 for a layer of amorphous Si with a thickness of 450 Å, which corresponds to the maximum Kerr rotation angle.

Figure 2:
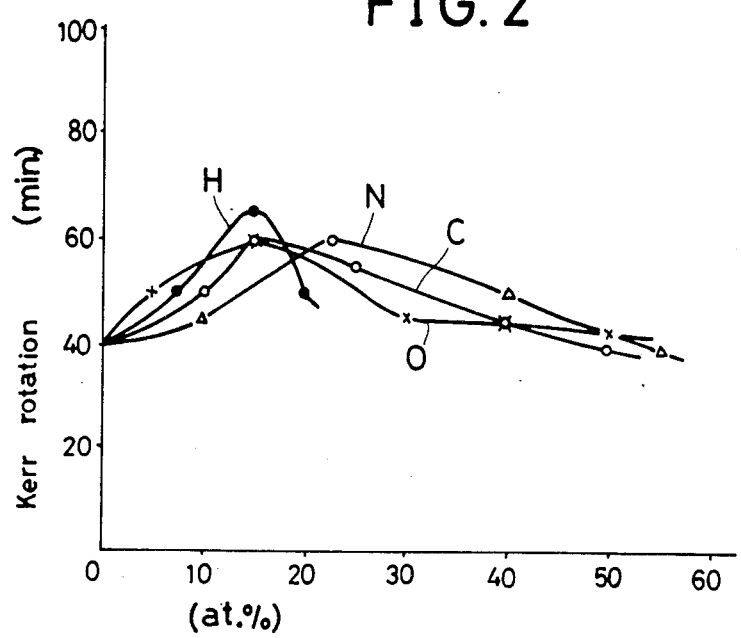
FIG. 2 shows the relationship between the amount of additional elements and the Kerr rotation angle, in another embodying example of this invention.

It can be seen from FIG. 2 that, for any of the added elements such as H, N, C, and O, the Kerr rotation angle increases according as the added amount of the element is increased, and after reaching a maximum at about 10–30 at.% of the added element, the Kerr rotation angle gradually decreases, remaining above 40 minutes until the added element is in an amount of about 50 at.%.

The above means that in the region corresponding to small amounts of the additional elements, the optical absorption decreases, causing an enhancement of the Kerr rotation angle, and if the additive amount is increased to more than about 50 at.%, the optical absorption amount becomes nearly zero, but the refractive index is lowered and in accordance therewith the Kerr rotation angle is gradually decreased.

It has been also confirmed that, in the case where two or more additional elements are mixed, there is an increase in the Kerr rotation angle.

Figure 3:
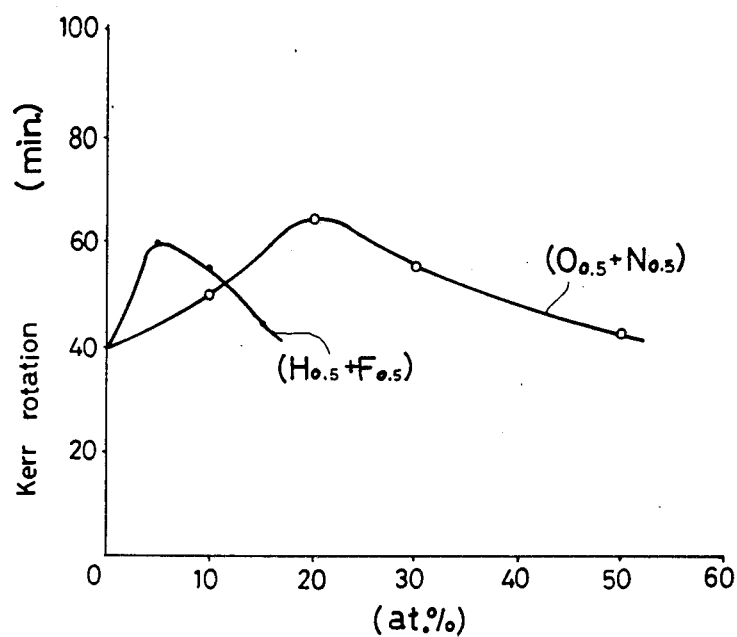
FIG. 3 shows the relationship between the amount of two additional elements and the Kerr rotation angle, in a modified example of this invention.

FIG. 3 shows the results of the addition of two additional elements. In this Figure, the pairs of additional elements, O and N, or H and F, are added in equal respective amounts.

Any of the foregoing additional elements has a strong bonding force with the the Si atom, and thereby the energy transition is increased.

The above experiments have been carried out with an optical magnetic recording member wherein reproducing is effected by irradiating a laser ray from the side adjacent to the transparent substrate. However, in the case where reproducing is effected by irradiating from the side adjacent to air, or in the case where a Kerr rotation angle enhancing layer is interposed between a semi-transparent magnetic layer and an opposite layer so as to be used for both a Faraday rotation and a Kerr rotation, a layer of amorphous Si, or amorphous Si containing at least one additional element such as H, C, N, F, and O can be used as enhancing layers which very effectively increase the Kerr rotation angle.

As in conventional magnetic recording members, the substrate for fixing the foregoing enhancing layer is not limited to a transparent one, but may be a nontransparent substrate made of organic or inorganic material.

Figure 4:
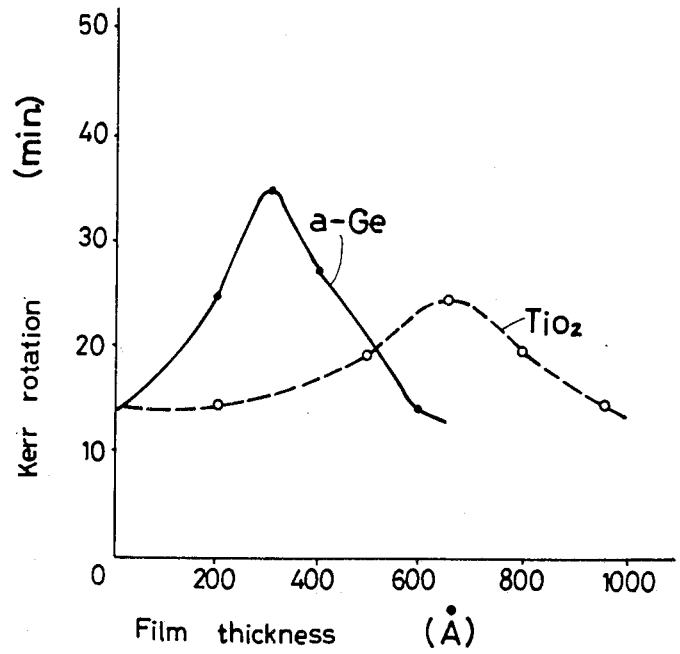
FIG. 4 shows the relationship between the layer thickness and the Kerr rotation angle, in another embodying example of this invention.
Figure 5:
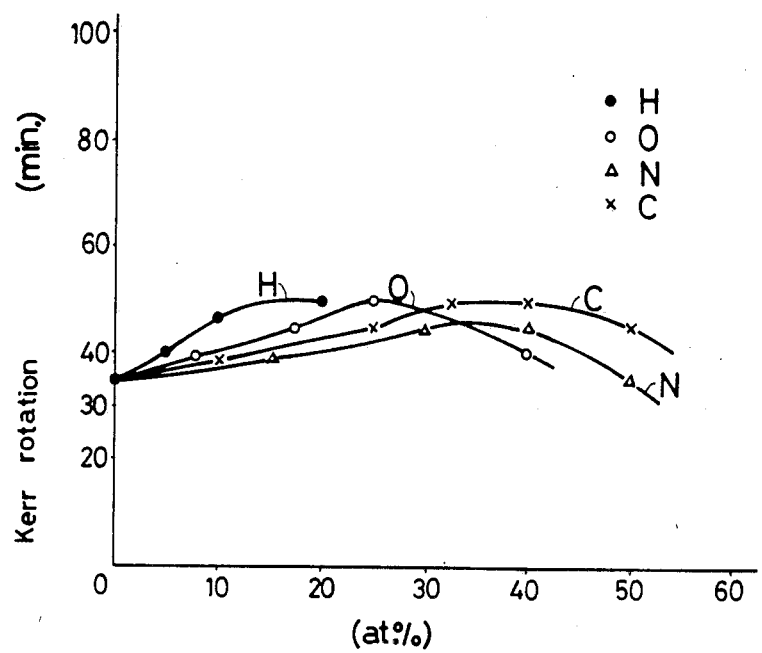
FIG. 5 shows the relationship between the amount of each additional element and the Kerr rotation angle, in another embodying example of this invention.
Figure 6:
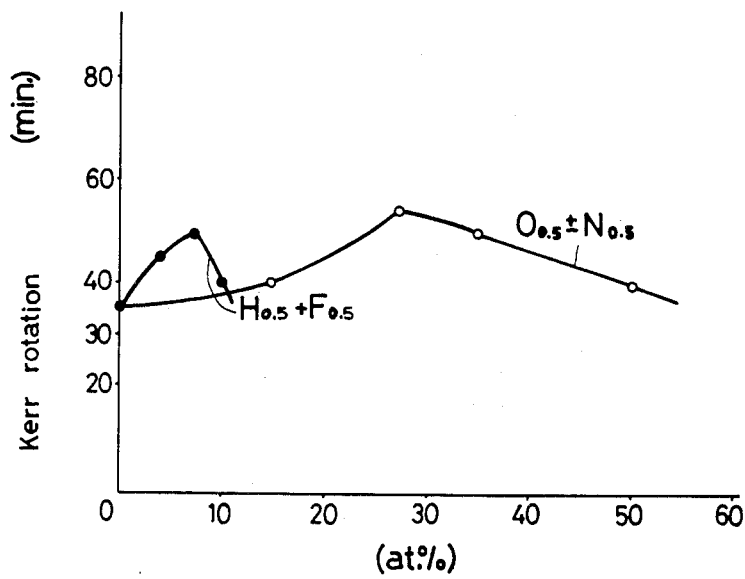
FIG. 6 is a diagram similar to FIG. 3, for another modified example of this invention.

FIGS. 4–6 show results obtained with other embodying examples of this invention in which an amorphous Ge layer is used as an enhancing layer. As shown in FIG. 4, there can be obtained a Kerr rotation angle which is larger than in a conventional magnetic recording member using a dielectric layer as an enhancing layer. FIG. 4 shows the results of measurement of Kerr rotation angles of various samples of optical magnetic recording members prepared by forming Tb-Fe magnetic layers on respective substrates, and providing thereon, respectively, conventional $TiO_2$ dielectric layers of different thicknesses, and amorphous Ge layers of different thicknesses. The Kerr rotation angle for samples having only the Tb-Fe layer is about 15 minutes. This angle can be increased to a maximum of 35 minutes in samples provided with the amorphous Ge layer, while it is only 25 minutes, at a maximum, for samples provided with the conventional $TiO_2$. The amorphous Ge layer is effective where its thickness is less than about 600 Å, the layer thickness giving the maximum Kerr rotation angle being 350 Å. Thus, the amorphous Ge layer is advantageous and more effective in its enhancing effect, requiring a thickness which is less than the thickness of 650 Å needed for a $TiO_2$ layer to give the maximum Kerr rotation angle.

Additionally, according to this invention, through many experiments wherein various elements are added to the amorphous Ge, it has been found that by adding elments such as H, C, O, N, F, the optical absorption coefficient of the resultant mixed layer can be decreased, and the Kerr rotation angle increased accordingly.

FIG. 5 shows the change in the Kerr rotation angle with changes in the amounts of each of the elements H, C, O, N added to the amorphous Ge layer of 300 Å in thickness. The Kerr rotation angle increases according as the added amount of each element is increased. However, the enhancing effect caused by the addition of the element declines after a certain amount has been added, and the addition of the element is effective until about 50 at.%. This means that, in the region corresponding to additions of small amounts, the lowering of the optical absorption amount serves to enhance the Kerr rotation angle, and if the additive amount is increased to more than about 50 at.%, the optical absorption amount becomes nearly zero, but the refractive index is lowered and in accordance therewith the Kerr rotation is decreased. Each of these elements has a strong bonding force to the Ge atom, and thus can serve to increase the energy transition therein.

Almost the same result can be obtained when two or more elements are simultaneously added to the amorphous Ge layer. FIG. 6 shows the enhancing effect of layers of amorphous Ge of 300 Å in thickness, containing H and F in equal proportions, or O and N in equal proportions, respectively, with the proportion of added elements to amorphous Ge being varied. Thus, it can be appreciated from FIGS. 5 and 6 that the Kerr rotation angle can be more greatly increased when at least one of the elements H, F, C, O, and N is added to the amorphous Ge layer in an amount of less than about 50 at.%.

Figure 7:
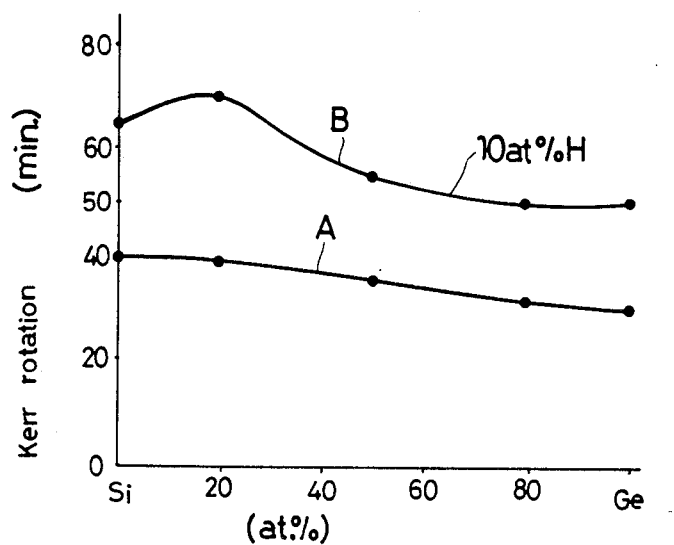
FIG. 7 is a characteristic diagram showing the Kerr rotation for a layer of Si-Ge alloy, in another modified example of this invention.

The foregoing examples show the enhancing effect on the Kerr rotation angle caused by a single layer of amorphous Si or amorphous Ge. Si and Ge exhibit almost identical semi-conductor characteristics, and it is possible to prepare enhancing layers of amorphous Ge.Si alloy in any desired mixing ratio. In FIG. 7, curve A shows the Kerr rotation angles of samples provided with layers of Ge.Si alloys of various alloy composition, and of a thickness of 350 Å. In addition, in FIG. 7, curve B shows the Kerr rotation angles of samples provided with layers of Ge.Si.H prepared by adding 10 mole % of H to the same Ge.Si alloy layers.

It can be seen that the layer of Ge.Si has almost the same enhancing effect as the amorphous Ge layer, and the enhancing effect is further increased when H is added to the layer of Ge.Si. Though not illustrated, it has been confirmed that almost the same enhancing effect as with H can be obtained by the addition of any of the elements C, O, N, and F. This amorphous Ge.Si layer exhibits a peak value of about 70–50 minutes in Kerr rotation angle, in both cases where the thickness is about 350 Å and about 1200 Å.

As a result of examining the relationship between the amount of the additional elements, and the optical absorption property of a layer of amorphous Ge or amorphous Ge.Si, it has been found that as the additional element is added, the optical absorption band of the layer is moved towards the shorter side of the wavelength of the laser, until the added amount is in the range of about 5–40 at.%, and the absorption at 800 nm is decreased, and in accordance therewith, the Kerr rotation angle is increased. However, if the added amount is above about 40 at.%, the index of refraction decreases, and in accordance therewith, the enhancement effect on the Kerr rotation angle also decreases.

The foregoing layer of amorphous Ge or amorphous Ge.Si may be formed by almost any of the processes described for forming the amorphous Si layer. The process for mixing at least one additional element such as F, H, C, N, and O or the like may be also carried out in almost the same manner as described for Si. However, the mixing can be also carried out by a combination of one or more of the foregoing processes with a plasma CVD process, using a gas such as $GeH_4$ and $GeF_4$ or the like.

For forming the amorphous Si.Ge layers of various compositions in the foregoing embodying examples, Si.Ge complex targets of various area ratios are used. All the foregoing embodying examples are prepared by using a glass plate for substrate. After layers of various thicknesses of amorphous Ge or amorphous Ge.Si are formed on the respective glass substrates, a film of 25 at.% Tb-Fe, of 1000 Å in thickness, is formed on each layer of amorphous Ge. Additionally, a protective film of $SiO_2$ of 1000 Å is formed thereon.

For measuring the Kerr rotation angle, a semiconductor laser of 830 nm is used, and the results are measured from the side of the glass substrate.

Thus, according to this invention, an amorphous layer of Si, Ge, or Ge.Si is used as an enhancing layer to give an optical magnetic recording member with an enhanced Kerr effect. If, additionally, to any of these layers is added at least one of the elements H, F, C, O, and N in an amount less than about 50 at.%, an optical magnetic recording member is obtained which has a further increased Kerr effect.

What is claimed is:

1. In an optical magnetic recording member wherein a substrate is provided with a magnetic layer, the improvement comprising providing said magnetic layer, at least on one surface thereof, with a layer of amorphous material which consists essentially of (a) at least one member selected from the group consisting of Si and Ge, and (b) one additional element selected from the group consisting of H, C, F, N, and O, wherein the amount of said additional element in the amorphous material is 10–40 at.%.

2. An improvement in an optical magnetic recording member as in any of claim 1 wherein the amorphous material has an index of refraction of 3.0–3.8, and has a small absorption coefficient for the wavelength of a laser ray used in recording on said optical magnetic recording member.

3. An improvement in an optical magnetic recording member as in claim 1 wherein the additional element is added in an amount less than about 30 at.%.

* * * * *